(12) United States Patent
Tagashira et al.

(10) Patent No.: US 7,463,736 B2
(45) Date of Patent: Dec. 9, 2008

(54) DATA PROCESS APPARATUS AND METHOD THEREFOR

(75) Inventors: Nobuhiro Tagashira, Kanagawa (JP); Keiichi Iwamura, Kanagawa (JP); Junichi Hayashi, Kanagawa (JP); Yuji Suga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 10/434,161

(22) Filed: May 9, 2003

(65) Prior Publication Data
US 2003/0190042 A1 Oct. 9, 2003

Related U.S. Application Data

(63) Continuation of application No. PCT/JP03/01863, filed on Feb. 20, 2003.

(30) Foreign Application Priority Data

Feb. 27, 2002 (JP) ............................. 2002/051823
May 30, 2002 (JP) ............................. 2002/157553

(51) Int. Cl.
*H04N 7/167* (2006.01)
(52) U.S. Cl. .................. 380/216; 380/210; 380/287; 713/176
(58) Field of Classification Search ................ 713/177, 713/163; 380/201
See application file for complete search history.

(56) References Cited

U.S. PATENT DOCUMENTS

| 4,933,969 A | * | 6/1990 | Marshall et al. ............. 713/177 |
| 5,535,140 A | | 7/1996 | Iwamura ..................... 364/550 |
| 5,604,752 A | | 2/1997 | Iwamura ..................... 371/37.1 |
| 5,742,620 A | | 4/1998 | Iwamura ................... 371/37.11 |
| 5,796,839 A | * | 8/1998 | Ishiguro ........................ 380/44 |
| 6,282,649 B1 | * | 8/2001 | Lambert et al. ............. 713/167 |
| 6,434,253 B1 | | 8/2002 | Hayashi et al. ............. 382/100 |
| 6,456,985 B1 | * | 9/2002 | Ohtsuka ....................... 705/51 |

(Continued)

FOREIGN PATENT DOCUMENTS

EP 0614308 A1 9/1994

(Continued)

OTHER PUBLICATIONS

Yongdong Wu et al., "Progressive Protection of JPEG2000 Codestreams," ICIP '04. 2004 International Conference on Image Processing, Singapore, Oct. 24-27, 2004, pp. 3447-3450.

(Continued)

*Primary Examiner*—Kambiz Zand
*Assistant Examiner*—Roderick Tolentino
(74) *Attorney, Agent, or Firm*—Fitzpatrick, Cella, Harper & Scinto

(57) ABSTRACT

In an image process apparatus, a key different for each level of hierarchy is generated on the basis of a specific key with respect to image data having a hierarchical structure, the image data in each level of the hierarchy is encrypted using the generated key for each level, and the specific key is managed, so that key management can be easily performed while the image data having a hierarchical structure is enciphered using different keys for each level of the hierarchy.

10 Claims, 13 Drawing Sheets

U.S. PATENT DOCUMENTS

| | | | |
|---|---|---|---|
| 6,553,183 B1 * | 4/2003 | Kataoka | 386/112 |
| 7,058,802 B1 * | 6/2006 | Epstein et al. | 713/150 |
| 7,120,802 B2 * | 10/2006 | Shear et al. | 713/194 |
| 2001/0053222 A1 | 12/2001 | Wakao et al. | 380/43 |
| 2002/0002682 A1 * | 1/2002 | Tsuchiyama et al. | 713/193 |
| 2003/0051200 A1 | 3/2003 | Iwamura | 714/758 |

FOREIGN PATENT DOCUMENTS

| | | |
|---|---|---|
| EP | 0 766 471 A1 | 4/1997 |
| JP | 6-259012 A | 9/1994 |
| JP | 6-301754 A2 | 10/1994 |
| JP | 2606074 B2 | 1/1995 |
| JP | 11-98487 A | 4/1999 |

OTHER PUBLICATIONS

A.M. Eskicioglu et al., "An integratd Approach to Encrypting Scalable Video," Multimedia and Expo, 2002, 2002 IEEE International Conference on Multimedia, Lausanne Switzerland, Aug. 26-29, 2002, pp. 573-576.

A, Menezes et al., "Handbook of Applied Cryptography," CRC Press Series on Discrete Mathematics and Its Applications, 1997, pp. 395-397.

* cited by examiner

High Quality
Image Area

High Quality
Image Area

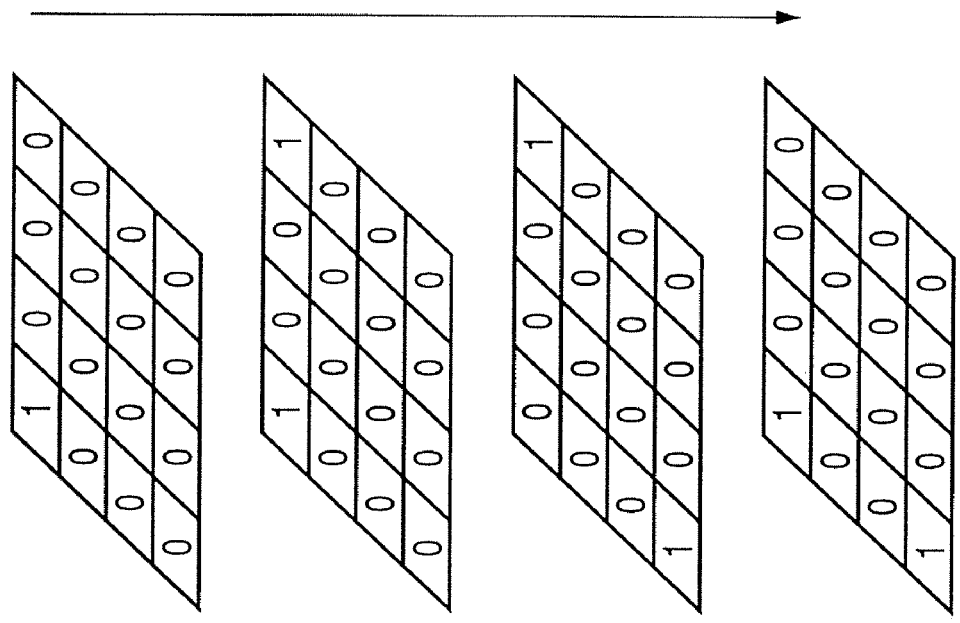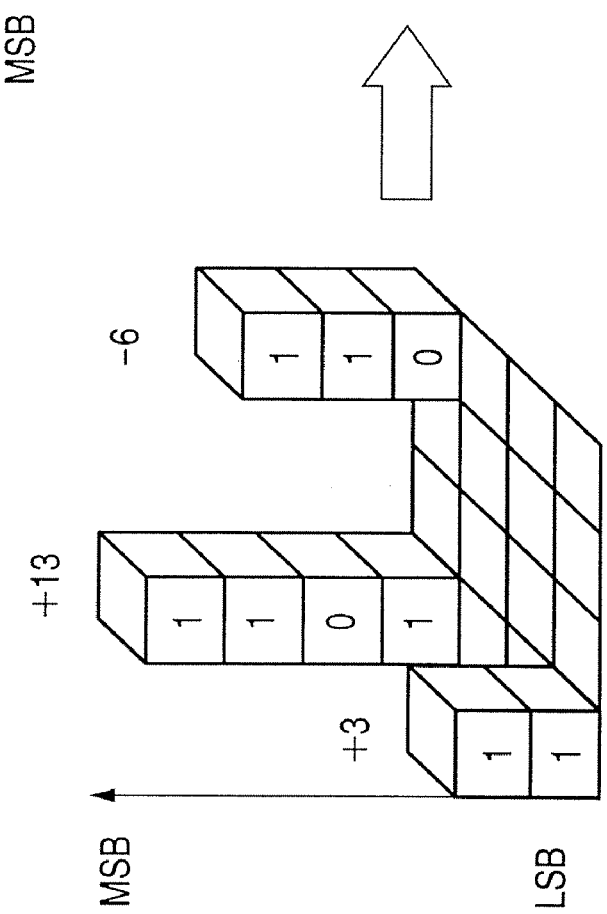
FIG. 9B
FIG. 9A

FIG. 12A

| Hierarchized Image Data | | Encrypted Key | | Encrypted Hierarchized Image Data |
|---|---|---|---|---|
| $TH0+BS0$ | $+$ | $k_0$ | $\rightarrow$ | $encimg_0 = Enc_{k_0}(TH0+BS0)$ |
| | | $\downarrow$ | | |
| $TH1+BS1$ | $+$ | $k_1 = H(k_0)$ | $\rightarrow$ | $encimg_1 = Enc_{k_1}(TH1+BS1)$ |
| | | $\downarrow$ | | |
| $TH2+BS2$ | $+$ | $k_2 = H(k_1)$ | $\rightarrow$ | $encimg_2 = Enc_{k_2}(TH2+BS2)$ |

FIG. 12B

| MH | emcimg0 | emcimg1 | emcimg2 |
|---|---|---|---|

FIG. 13A

| Hierarchized Image Data | Encrypted Key | | Encrypted Hierarchized Image Data |
|---|---|---|---|
| LL | + | $k_0$ | → $encimg_0 = Enc_{k_0}(LL)$ |
| | | ↓ | |
| HL2 | + | $k_1 = H(k_0)$ | → $encimg_1 = Enc_{k_1}(HL2)$ |
| | | ↓ | |
| LH2 | + | $k_2 = H(k_1)$ | → $encimg_2 = Enc_{k_2}(LH2)$ |

FIG. 13B

| emcimg0 | emcimg1 | emcimg2 |
|---|---|---|

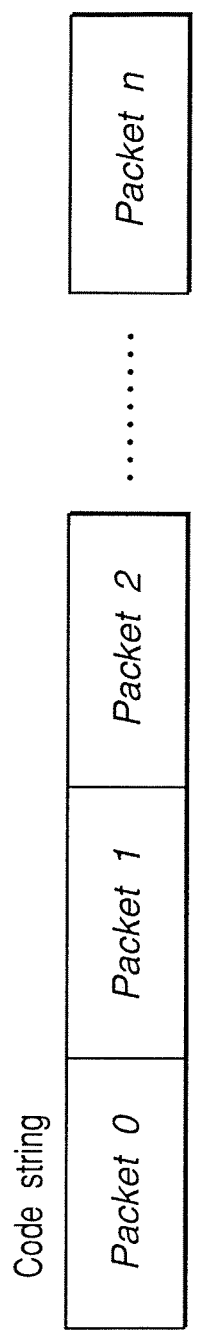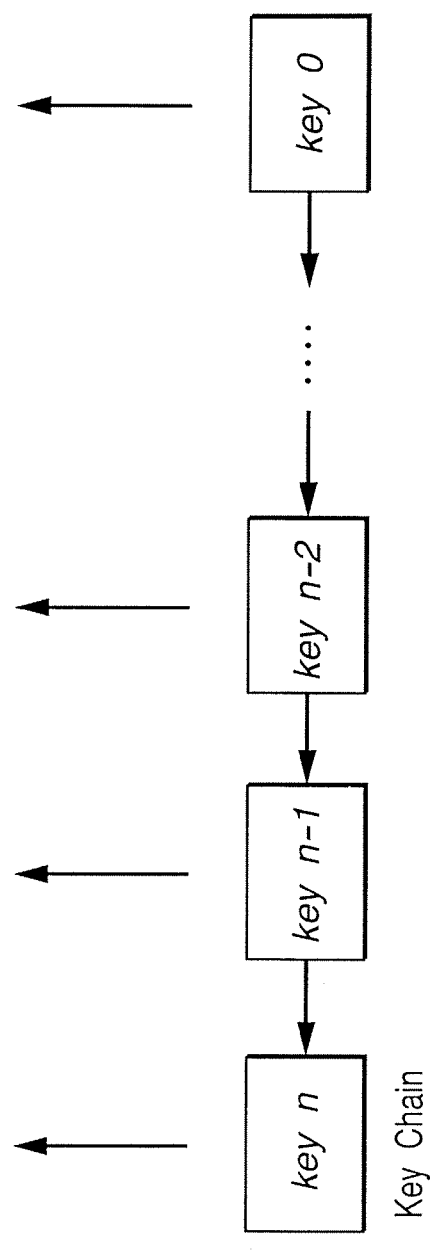
FIG. 15A
FIG. 15B

DATA PROCESS APPARATUS AND METHOD THEREFOR

This application is a continuation of International Application No. PCT/JP03/01863, filed Feb. 20, 2003, which claims the benefit of Japanese Patent Applications Nos. 051823/2002, filed Feb. 27, 2002, and 157553/2002, filed May 30, 2002.

BACKGROUND OF THE INVENTION

1. Field of the Invention

The present invention relates to a data process, particularly to an encryption technique for data having a hierarchical structure.

2. Related Background Art

In recent years, various digital devices such as personal computers, PDAs, portable phones and the like have been developed and used. These digital devices have various functions such as screen size, resolution, color numbers, and the like with respect to image display. Various image formats are employed in order to cope with the multiplicity of display functions. Specifically, there is a type of format having images in a hierarchical manner like Flash Pix, JPEG2000. Some of these formats having a hierarchical structure hold only differential data relative to adjacent hierarchized image data as hierarchized image data, thereby reducing the amount of image data that has to be handled.

On the other hand, copyright protection of digital contents has been seen as a problem along with free utilization of the digital contents by high performance of digital devices and quality improvement of the digital contents.

With this situation as background, various inventions for realizing access control for each hierarchy have been made with respect to hierarchical images.

According to Japanese Patent Application Laid-Open No. 6-301754, an image is decomposed into a low resolution image and a high resolution image, and a key is used for only the high resolution image to perform encryption so that the low resolution image can be accessed without a key and the high resolution image can be accessed only by using the key.

Further, according to Japanese Patent No. 2606074, image data is decomposed into a plurality of spatial components at the transmission side, encoding is performed for each component, encryption is performed for each of the resulting sets of encoded data, and the encrypted data is multiplexed to be transmitted. At the reception side, the received multiplexed data is separated, each separated set of enciphered data is deciphered into unencrypted but encoded data, and each set of this encoded data is decoded into component data, and the image data is obtained by combining the several sets of component data.

In Japanese Patent Application Laid-Open No. 6-301754 described above, since the low resolution image data which is low hierarchical image data is not encrypted, access control for each level of the hierarchy of the image data cannot be realized. The keys used for encryption of the respective levels cannot be the same key, when it is considered that encryption is performed for each level. Further, when the hierarchized image data is differential data relative to adjacent hierarchized image data and access is made to specific hierarchized image data, not only the key corresponding to the hierarchized image data to be accessed but also the keys corresponding to the respective dependent hierarchized image data are also required.

Therefore, in order to realize access control for each level of the hierarchy of the hierarchized image data, a plurality of different keys are required. When making access to specific one-hierarchy image data, a plurality of keys may still be used, so that key management is complicated. However, Japanese Patent Application Laid-Open No. 6-301754 discloses only that an encrypted key is input by a user. Further, Japanese Patent No. 2606074 does not disclose the encrypted key management.

The upper limit of high resolution of an image has been increasingly high along with quality improvement of the image thanks to the increasingly high performance of digital devices in recent years. On the other hand, when utilization of images in a mobile device such as portable phone or PDA (Personal Digital Assistant) is considered, the lower limit of low resolution is not lowered, and does not become remarkably higher. This fact means that the width of the range of image resolutions used is increased, and that the number of hierarchies is increased in a hierarchical image. Therefore, when management is performed using a conventional method, the number of keys to be managed also is increased as the number of hierarchies is increased, so that the key management method is seen as a problem.

Moreover, there is a demand to reduce a problem relating to key distribution by utilizing a key possessed by a user when encrypted key management is considered.

SUMMARY OF THE INVENTION

The present invention has been made in terms of the above problems, and it is therefore an object to provide a technique for reducing the number of keys to be managed and facilitating key management in access control for hierarchical data.

Further, it is another object to provide a technique for facilitating key distribution to a user.

According to one aspect of the present invention, there is provided a data process apparatus that comprises key generation means, and encryption means for the data. The key generation means generate a plurality of keys for respective hierarchical levels of the data, and more particularly generate a key for a top level by converting a basic key with a predetermined function, and generating respective keys for other levels by converting a key for a preceding level with the predetermined function. The encryption means are for encrypting data in each level using a respective one of the plurality of keys. A corresponding method is another aspect of the invention.

According to another aspect of the present invention, there is provided a data process apparatus that comprises key generation means for generating a plurality of keys for respective hierarchical levels of data in a hierarchical structure by converting a basic key with a predetermined function and generating respective keys for other levels by converting a key for a preceding level with the predetermined function. The apparatus also has decoding means for decoding data in a predetermined level of the hierarchy using a key corresponding to that level of the hierarchy. A corresponding method is another aspect of the invention.

According to still another aspect of the present invention, there is provided a data process apparatus in which there are generated a plurality of keys for respective levels lower than a predetermined level of the hierarchy of data, and keys for lower levels are generated by converting a key for a preceding level with the predetermined function. A corresponding method is another aspect of the invention.

BRIEF DESCRIPTION OF THE DRAWINGS

FIGS. 9A and 9B are diagrams for explaining operation of an entropy encoding unit according to the second embodiment;

FIGS. 12A and 12B are diagrams showing an encryption method with tile header and bit stream as hierarchized image data according to the second embodiment;

FIGS. 13A and 13B are diagrams showing an encryption method with sub-band encoded data as hierarchized image data according to the second embodiment;

FIGS. 15A and 15B are diagrams showing another correspondence between a code string of image data which is a packet collection and encrypted keys according to the second embodiment.

DETAILED DESCRIPTION OF THE PREFERRED EMBODIMENTS

Hereinafter, embodiments according to the present invention will be described with reference to the drawings.

Figure 1:
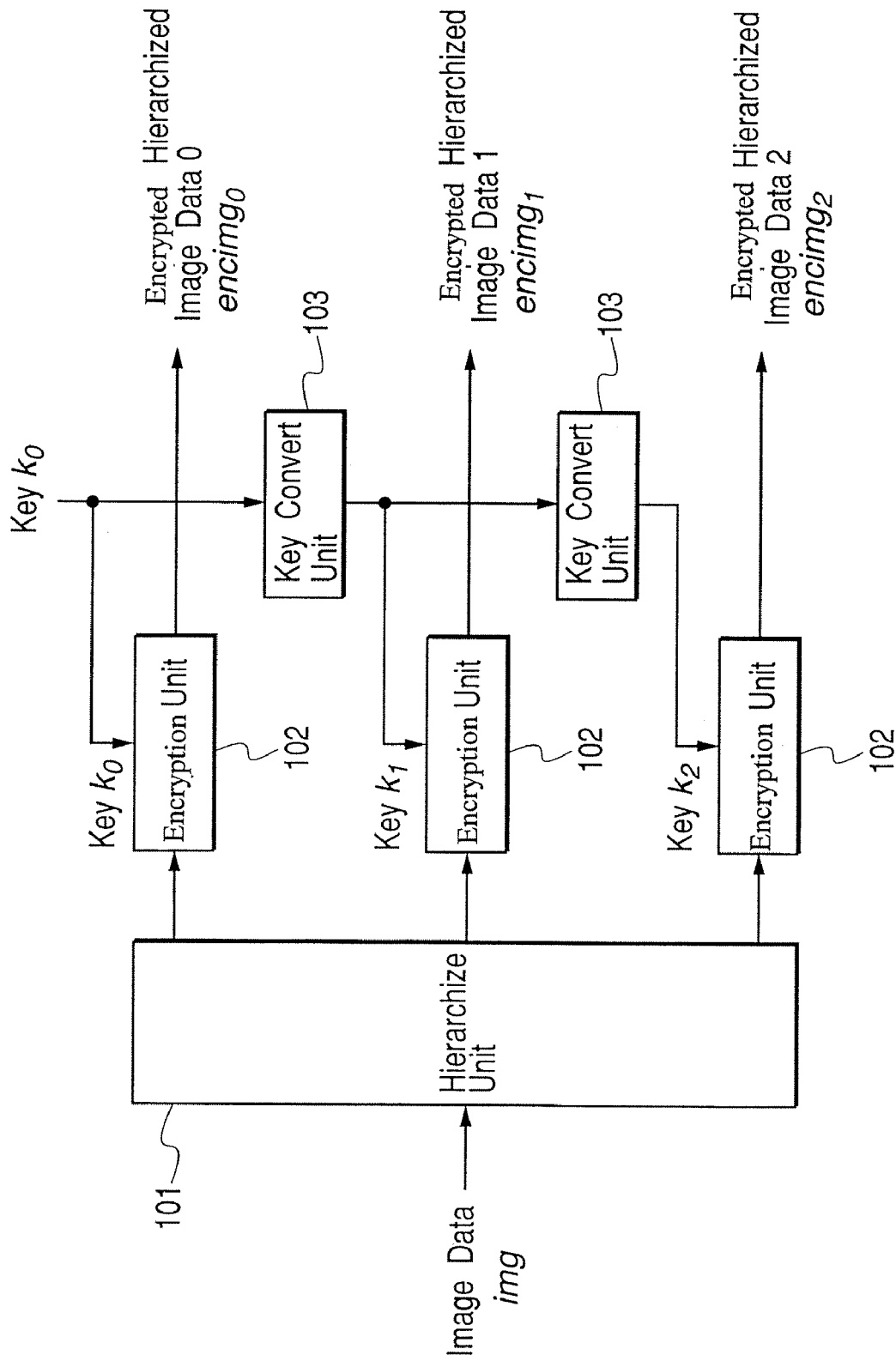
FIG. 1 is a diagram showing a configuration of an image access control apparatus according to an embodiment of the present invention.

FIG. 1 is a configuration diagram showing an outline of an image access control apparatus (image process apparatus) according to an embodiment of the present invention. As shown in FIG. 1, the image process apparatus according to the present embodiment is configured with a hierarchizing unit 101, a plurality of encryption units 102, and a plurality of key conversion units 103.

Hierarchizing unit 101 inputs image data img, separates the input image data img for each hierarchy, and outputs each separated set of hierarchized image data.

The plurality of encryption units 102 inputs the hierarchized image data, enciphers each input set of hierarchized image data using keys k0, k1, and k2, respectively, and outputs the encrypted hierarchized image data encimg0, encimg1, and encimg2. In the encryption unit 102, an encryption algorithm such as DES (Data Encryption Standard), AES (Advanced Encryption Standard), or the like is available, but which encryption algorithm is utilized is not particularly limited.

Figure 2:
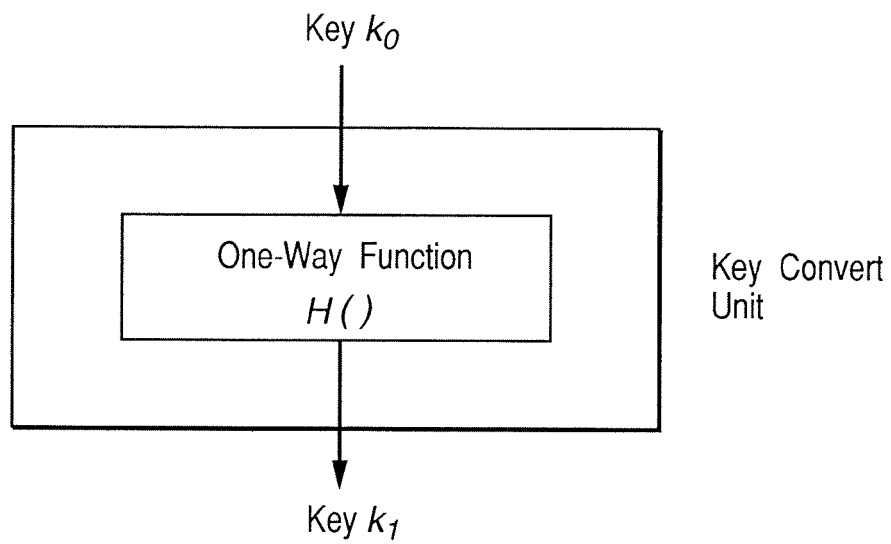
FIG. 2 is a diagram showing a configuration of a key convert unit according to a first embodiment of the present invention.

The high-order key conversion unit 103 inputs the key k0 to convert, and outputs the key k1. Further, in the low-order key conversion unit 103, this key k1 is input and converted, and the key k2 is output. FIG. 2 is a diagram showing a configuration of the key conversion unit 103. As shown in FIG. 2, the key conversion unit 103 converts a key using one-way function. The one-way function is a function by means of which it is easy to convert input data and to obtain output data, but it is impossible or difficult inversely to convert the output data and obtain the original input data.

A one-way hash function has been known as one such one-way function. The one-way hash function $H(\ )$ is a compressibility function for converting data having an arbitrary length into data having a certain length in which a collision of $H(x1)=H(x2)$ is unlikely to occur with respect to different $x1$ and $x2$. Therefore, it is difficult to find $x1$ and $x2$ that meet the condition $H(x1)=H(x2)$. That is, it is also difficult to find $x$ which is led to $y=H(x)$ from arbitrary $y$, so that the one-way function is established. As the one-way hash function, MD5 (Message Digest 5), SHA-1 (Secure Hash Algorithm 1), and the like are known.

Another of the one-way functions is used for a method using encryption function. Formula $y=Enc\_k(x)$ expresses that a key $k$ is used to encipher data $x$ and to obtain enciphered data $y$. Here, input data is denoted as $x$, output data is denoted as $y$, and the output data $y$ is obtained by the equation $y=Enc\_k(x)$, so that the one-way function can be realized. In other words, if the data $x$ is held, the data $y$ can be obtained from the data $x$ because the key $k$ is known. But, if only the data $y$ is held, the data $x$ is difficult to obtain from the data $y$ because the key $x$ is not known. Furthermore, it is possible to realize the compressibility function for converting data having an arbitrary length into data having a certain length by using an encryption mode such as CBC (Cipher Block Chaining) or the like.

Further, when the one-way function is realized by the method using the encryption function and this encryption function is used together with the encryption function used for image data enciphering, a circuit or program in mounting can be reduced in size. But the present embodiment does not limit the one-way function to the above functions.

As described above, the hierarchizing unit 101 generates image data having a hierarchical structure, the key conversion unit 103 generates a key different for each level on the basis of the specific key k0, and the encryption unit 102 enciphers the image data at each level of hierarchy using the key of that level of hierarchy.

Figure 3:
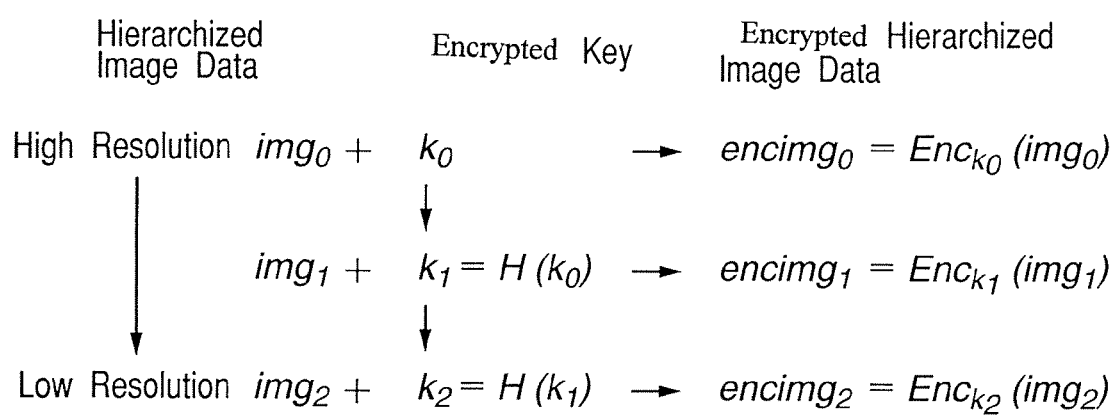
FIG. 3 is a diagram showing a first correspondence between image data and enciphered keys according to the first embodiment.

FIG. 3 is a diagram showing a correspondence between hierarchized image data and keys for encryption of the same. Hereinafter, the hierarchized image data is configured on the basis of image resolution, and it is assumed that the highest resolution hierarchized image data is the highest level image data and the lowest resolution hierarchized image data is the lowest level image data.

At the left side of FIG. 3, the hierarchized image data is shown. The hierarchized image data is expressed by img0 to img2, where the hierarchized image data img0 is the highest resolution hierarchized image data and the hierarchized image data img2 is the lowest resolution hierarchized image data.

At the center of FIG. 3, the keys are shown. It is assumed that a key used for encryption of the highest resolution hierarchized image data is k0 and a key used for encryption of the lowest resolution hierarchized image data is k2. Further, the one-way function is expressed by H( ), and the keys are sequentially converted using the one-way function H( ) as shown in FIG. 3.

At the right side of FIG. 3, the encrypted hierarchized image data is shown. The encryption function is expressed by Enc( ), and the subscript indicates a key. That is, the highest resolution hierarchized image data is encrypted with the key k0 as a key, and the lowest resolution hierarchized image data is encrypted with the key k2 as a key.

Figure 4:
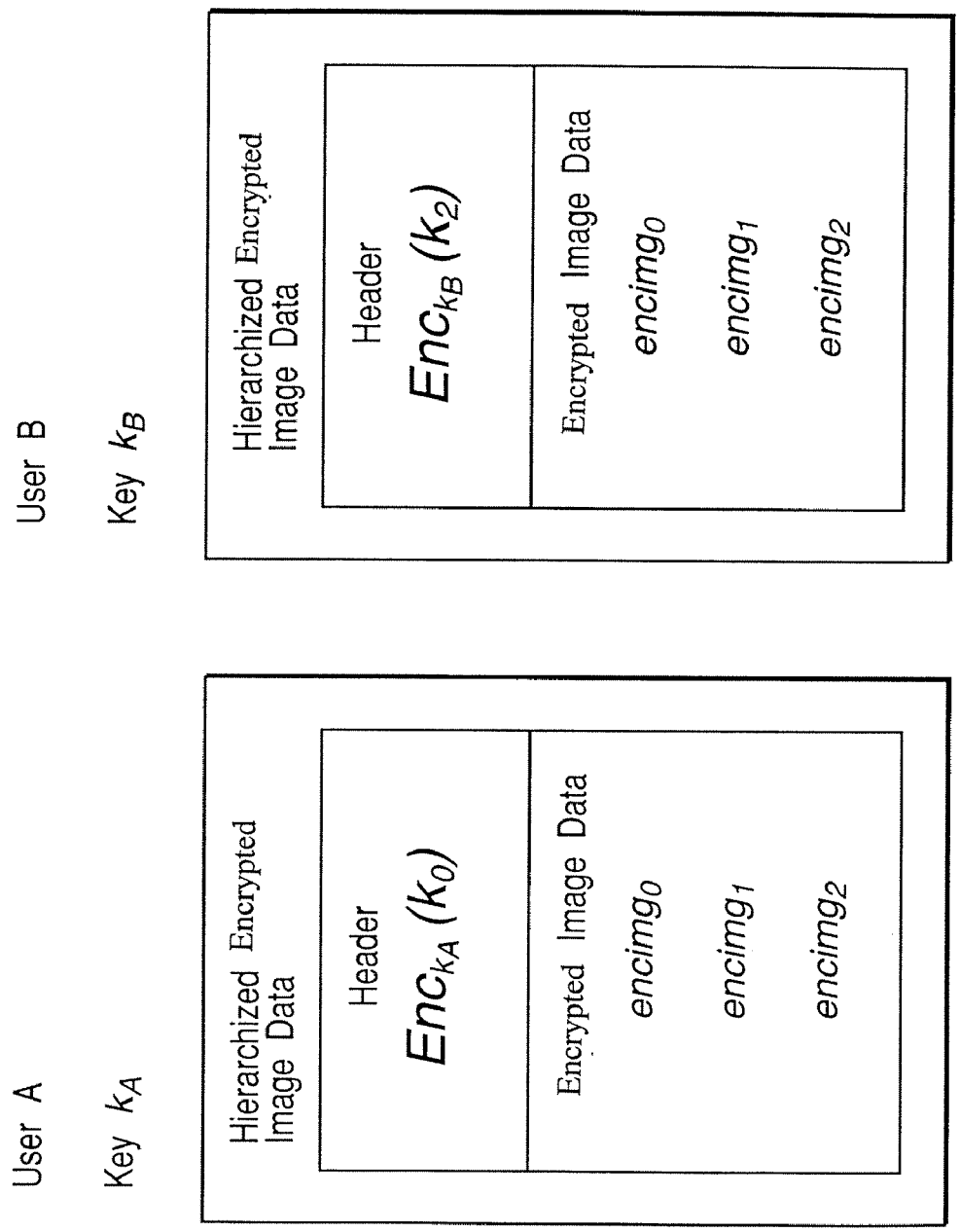
FIG. 4 is a diagram showing an image file format according to the first embodiment.

Next, one example of an image file format including hierarchized image data for each user is shown with reference to FIG. 4. As shown in FIG. 4, the image file format is divided into an encrypted image data portion and a header portion, the encrypted image data portion includes the encrypted hierarchized image data encimg0 to encimg2, and the header portion includes encrypted data of the key. Hereinafter, the case where the image data is hierarchized image data having three levels of hierarchy shown in FIG. 3 will be assumed and described.

At the left side of FIG. 4, there is described an image file format in a case where a user A holds a key kA in advance and he/she is a user who has access to the highest resolution image. The encrypted image data portion includes the encrypted hierarchized image data encimg0, encimg1, and encimg2, and the header portion includes encrypted data of the key. The encrypted data of the key is data obtained by encrypting the key k0 for accessing the highest resolution image data using the key kA of the user A.

Further, at the right side of FIG. 4, there is described an image file format in case where a user B holds a key kB in advance and he/she is a user who has access to the lowest resolution image. The encrypted image data portion includes the encrypted hierarchized image data encimg0, encimg1, and encimg2 similarly to the encrypted image data portion of the user A, and the header portion includes the encrypted data of the key. The enciphered data of the key is data obtained by encrypting the key k2 for accessing the lowest resolution image data using the key kB of the user B.

Next, the case of making access to each hierarchized image data will be described with reference to FIG. 3. The present embodiment is a method for realizing access control of image data, where a user of the image data is assumed to hold a key.

At first, there will be described a user who holds a key k0 that provides access to the highest resolution image data. The user holding the key k0 can use the key k0 to decode the encrypted hierarchized image data encimg0 and to obtain the hierarchized image data img0. In addition, it is possible to obtain the key k1 from the key k0 using the one-way function. Similarly, it is possible to decode the encrypted hierarchized image data encimg1 and to obtain the hierarchized image data img1 using the key k1, and further it is possible to obtain the key IC from the key k1 using the one-way function. Moreover, similarly, it is possible to obtain the hierarchized image data img2 so as to restore the image data.

Next, there will be described a user who holds the key 2 that provides access to the lowest resolution image data. The user holding the key k2 can use the key k2 to decode the encrypted hierarchized image data encimg2 and to obtain the hierarchized image data img2. However, since the key conversion is a conversion by the one-way function, it is not possible to obtain the key k1 or key 0 from the key 2. Therefore, it is not possible to decode the encrypted hierarchized image data encimg1 or encimg0, and thus it is not possible to obtain the hierarchized image data img1 or img0. That is, the user holding the key k2 can obtain only the hierarchized image data corresponding to the key k2 and the lower hierarchized image data. This easily enables one to realize free access to only the lowest hierarchized image data, which is the lowest resolution image data as utilization of thumbnail image data. In other words, according to the present embodiment, the key used for encryption of the lowest level hierarchized image data is always made public, so that anyone can access the lowest level hierarchized image data, while no one can access the hierarchized image data at the higher levels due to the one-way characteristic of the key.

Further, the case where each user accesses the hierarchized image data will be described with reference to FIG. 4. At first, there will be described the user A who holds the key kA and can access the highest resolution image data. The user A holding the key kA decodes using the key kA from the header portion of the image file format shown at the left side of FIG. 4 to obtain the key k0. The user A who has obtained the key k0 can use the key k0 to decode the encrypted hierarchized image data encimg0 and to obtain the hierarchized image data img0 as shown in FIG. 3. Further, it is possible to obtain the key k1 from the key k0 using the one-way function. Similarly, it is possible to decode the encrypted hierarchized image data encimg1 and to obtain the hierarchized image data img1 using the key k1, and further it is possible to obtain the key k2 form the key k1 using the one-way function. Furthermore, similarly, it is possible to obtain the hierarchized image data img2 and to restore (decode) the image data.

Next, there will be described the user B who holds the key kB and can access the lowest resolution image data. The user B holding the key kB decodes using the key kB from the header portion of the image file format shown at the right side of FIG. 4 to obtain the key k2. The user B who has obtained the key k2 can use the key k2 to decode the encrypted hierarchized image data encimg2 and to obtain the hierarchized image data img2 as shown in FIG. 3. However, since the key conversion is a conversion by the one-way function, it is not possible to obtain the key k1 or key k0 from the key k2. Therefore, it is not possible to decode the encrypted hierarchized image data encimg1 or encimg0, and thus it is not possible to obtain the hierarchized image data img1 or img0. In other words, the user holding the key k2 can obtain only the hierarchized image data corresponding to the key k2 and the lower hierarchized image data. This easily enables one to realize free access to only the lowest level hierarchized image data which is the lowest resolution image data as utilization of thumbnail image data. In other words, according to the present embodiment, the key used for encrypting the lowest level hierarchized image data is always made public, so that anyone can access the lowest level hierarchized image data, while no one can access the hierarchized image data at the higher levels due to the one-way characteristic of the key.

As described above, the encryption unit 102 encrypts one key out of the keys for each hierarchy, and outputs it together with the encrypted image data encimg0, encimg1, encimg2 in each hierarchy. The image process apparatus of the user comprises input means for inputting encrypted image data obtained by encrypting image data having a hierarchical structure by a key different for each hierarchy and a key obtained by encrypting one key out of the keys for each hierarchy, and decode means for decoding the encrypted key and decoding encrypted image data at a hierarchy corresponding to the key and the lower hierarchies using the decoded key.

The present embodiment realizes access control for each set of hierarchized image data by inputting image data, hierarchizing the input image data, and encrypting each set of hierarchized image data. Namely, when encryption is used, only the hierarchized image data corresponding to the key is made available, so that access control for each hierarchized image data can be realized. Further, the encrypted key for each level of the hierarchy is characterized by chaining the keys on the basis of conversion by the one-way function. In other words, only a key chain in a specific direction can be easily calculated. Further, the direction of the key chain and the direction from high-order to low-order of the hierarchized image data are made to coincide so that the encrypted key in the low-order hierarchy can be easily obtained from the encrypted key in the high-order hierarchy. On the contrary, it is difficult or impossible to obtain the encrypted key in the high-order hierarchy form the encrypted key in the low-order hierarchy. In other words, when it is possible to make access to the hierarchized image data in the high-order hierarchy, it is possible to realize that access to the hierarchized image data in the high-order hierarchy is not available even when access to the hierarchized image data in the low-order hierarchy is available. Additionally, the key corresponding to the specific hierarchized image data is encrypted using the user's key so that key distribution to the user is enabled.

Further, the image data hierarchizing employs a hierarchizing method based on resolution, a hierarchizing method based on the degree of importance, a hierarchizing method based on SNR (Signal-to-Noise Ratio), or the like, but is not particularly limited thereto. Further, there is employed a method where the hierarchized image data is assumed as image data with respect to a corresponding hierarchy, or a method where the hierarchized image data is assumed as differential data relative to adjacent hierarchized image data, but the method is not limited thereto.

Furthermore, there is described a method for making the key used for encrypting the lowest hierarchized image data public in the method where the lowest hierarchized image data which is the lowest resolution image data can be freely accessed like the thumbnail image. However, the same function can be realized even without encrypting the lowest hierarchized image data.

Figure 5:
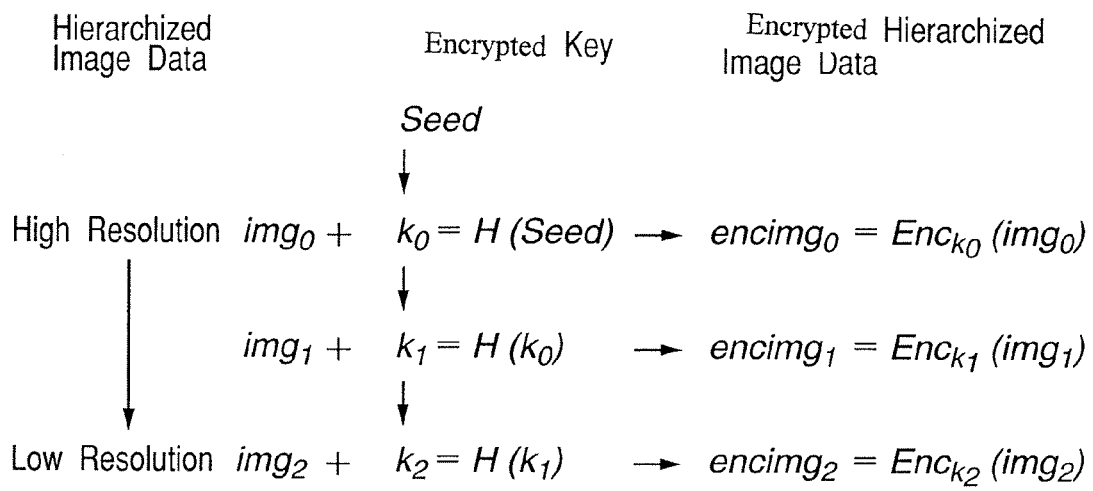
FIG. 5 is a diagram showing a second correspondence between image data and enciphered keys according to the first embodiment.

Moreover, a key chain method as shown in FIG. 5 is also considered. In the key chain method shown in FIG. 5, a random number Seed is converted by the one-way function to generate an encrypted key k0 of the highest hierarchized image data. For example, it is considered that the random number Seed is generated in association with a distributor of the image data and the image data. For example, it is assumed that a private key (private information) different for each distributor is Seed_Distributor, the image data is img, and the random number Seed is Seed=H(Seed_Distributor|img), where the symbol "|" indicates a data link.

In the key chain method shown in FIG. 3, when a plurality of items of image data are distributed by different access control methods, the key k0 has to be managed for each image data. However, in the key chain method shown in FIG. 5, when the random number Seed is generated depending on the private key for each distributor and the image data, the distributor has only to manage the private key so that a plurality of items of image data can be distributed by different access control methods.

An encryption algorithm can be classified into a common key encryption method and a public key encryption method. The common key encryption method is a method where common information between a transmitter and a receiver is secretly shared as a key and a message is converted using this key at the transmitter side and the receiver side, respectively. Since the same key is secretly shared, this method is called a private key encryption method, symmetry key encryption method, or common-use encryption method. As the common key encryption method, DES (Data Encryption Standard), AES (Advanced Encryption Standard), and the like are known. Further, the public key encryption method is an encryption method where a key for enciphering and a key for decoding are different so that even when one key is made public, other key can be kept in secret. A key to be made public is called a public key, and the other key is called a private key, which is held in secret. The public key and the private key are made to correspond in a one-to-one manner, and the message converted by the public key can be decoded by only the private key corresponding thereto. Further, the system is designed so that the private key is not known from the public key. As the public key encipher method, RSA encipher, ElGamal encipher, and the like are known. Further, in many cases, a system using the public key encryption method is utilized under a public key infrastructure (hereinafter, referred to as PKI) using a certification agency (hereinafter, referred to as CA), a certificate, and a certificate lapse list (hereinafter, referred to as CRL). A certificate for the user's public key created by the CA and the public key are used together to ensure authority of the public key. In addition, in the process of verification of the certificate, it is possible to check whether or not the certificate has been canceled with reference to the CRL.

The encryption method between the distributor and the user of the image data according to the present embodiment can employ the private key encryption method or the public key encryption method described above, and further can employ the public key encryption method based on the PKI so that the respective methods can be appropriately used depending on strictness of the key management or the like.

As described above, according to the present embodiment, when image data has a hierarchical structure and access control is realized using a key with respect to the image data for each level of the hierarchy, it is possible to provide a method capable of easily performing key management. In addition, it is possible to provide a method capable of easily performing key distribution to a user. The present embodiment is not limited to image data, and is applicable to multimedia data.

SECOND EMBODIMENT

Hereinafter, a second embodiment of the present invention will be described. The second embodiment will be specifically described in the case of being adapted to the JPEG2000 image encoding method.

The JPEG2000 encoding method will be described.

Figure 6:
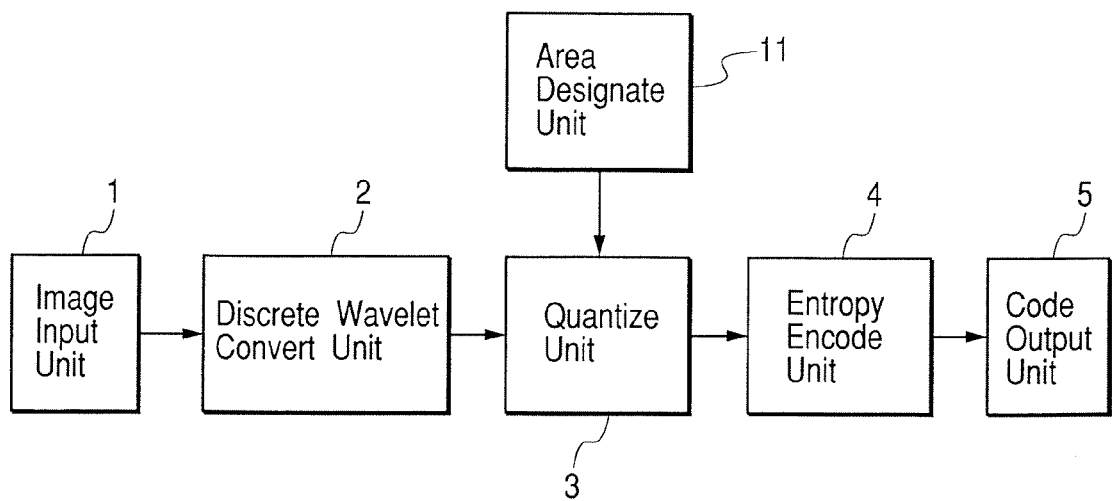
FIG. 6 is a diagram showing a configuration of a JPEG2000 image encode apparatus according to a second embodiment of the present invention.

In FIG. 6, numeral 1 denotes an image input unit, numeral 2 denotes a discrete wavelet conversion unit, numeral 3 denotes a quantization unit, numeral 4 denotes an entropy encoding unit, numeral 5 denotes an encoding output unit, and numeral 11 denotes an area designating unit.

At first, pixel signals configuring an image to be encoded are input into the image input unit 1 in raster scanning order, and the outputs thereof are input into the discrete wavelet conversion unit 2. The image signals express a monochrome multi-value image in the following description, but when a plurality of color components such as a color image are encoded, any of the RGB color components, or brightness/chromaticity component may be compressed as the above single color component.

Figure 7A:
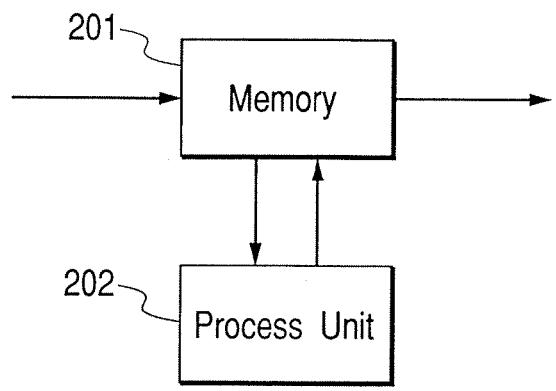
FIGS. 7A, 7B, and 7C are diagrams showing a basic configuration of a discrete wavelet conversion unit according to the second embodiment.
Figure 7B:
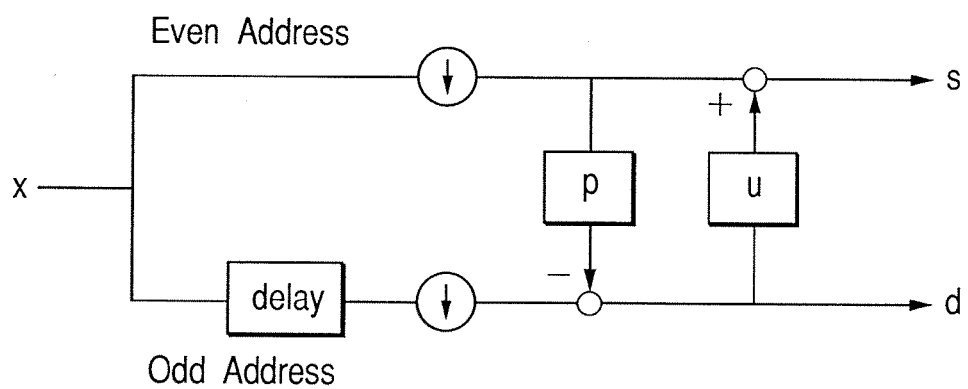

The discrete wavelet convert unit 2 performs a two-dimensional discrete wavelet conversion process with respect to the input image signals to calculate and output a conversion coefficient. FIG. 7A shows a basic configuration of the discrete wavelet conversion unit 2, where the input image signals are stored in a memory 201 and sequentially read by the process unit 202 so that conversion process is performed, and then the signals are rewritten into the memory 201. In the present embodiment, the configuration of processing in the processing unit 202 is shown in FIG. 7B. In the drawing, the input image signals are separated into an even address and an odd address by a combination of a delay element and a down sampler, and are subjected to filter process by two filters p and u. s and d in FIG. 7B denote a low-pass coefficient and a high-pass coefficient, respectively, when one-level decomposition is performed for one-dimensional image signal, which are calculated by the following equations:

$$d(n)=x(2*n+1)-\text{floor}((x(2*n)+x(2*n+2))/2) \quad \text{(Equation 1)}$$

$$s(n)=x(2*n)+\text{floor}((d(n-1)+d(n))/4) \quad \text{(Equation 2)}$$

where x(n) is an image signal to be converted.

Figure 7C:
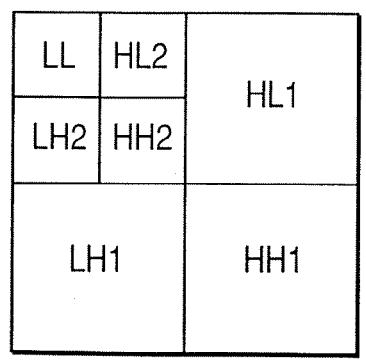

One-dimensional discrete wavelet conversion processing is performed for the image signal by the above process. The two-dimensional discrete wavelet conversion involves sequentially performing the one-dimensional conversion with respect to the horizontal and vertical directions of the image, and details thereof are well known so that description thereof will be omitted. FIG. 7C is a configuration example of a two-level conversion coefficient group obtained by the two-dimensional conversion process, where the image signal is decomposed into coefficient strings having different frequency bands of HH1, HL1, LH1, . . . , LL. In the following description, these coefficient strings are referred to as a sub-band. A coefficient of each sub-band is output to the succeeding quantization unit 3.

Figure 8A:
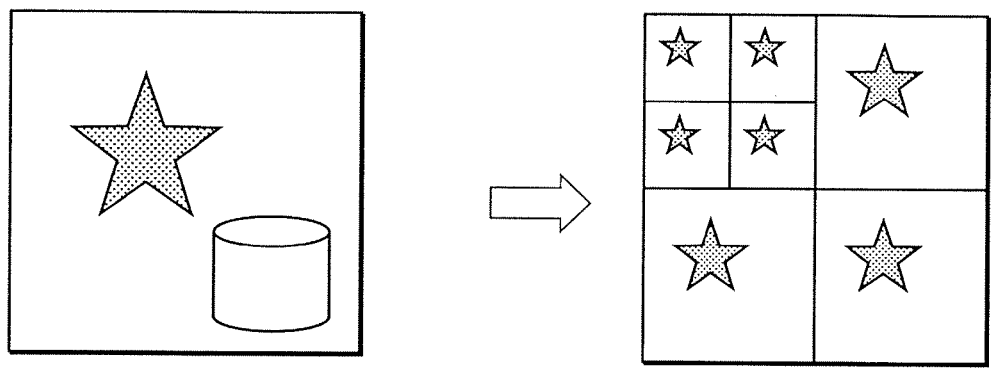
FIGS. 8A, 8B, and 8C are diagrams showing processing in an area designating unit according to the second embodiment.

The area designating unit 11 determines an area (ROI: region of interest) to be decoded with higher quality as compared with the surrounding portions in the image to be encoded, and generates mask information indicating which coefficient belongs to a designated area when the target image is converted in a discrete wavelet manner. FIG. 8A shows one example when the mask information is generated. When a star-shaped area is designated in the image through a predetermined instruction input as shown at the left side of FIG. 8A, the area designating unit 11 calculates a portion occupied by the designated area in each sub-band when the image including this designated area is converted in a discrete wavelet manner.

An example of the mask information calculated in this manner is shown at the right side of FIG. 8A. In this example, the mask information when the two-level discrete wavelet conversion is performed for the image at the left side of FIG. 8A is calculated as in the drawing. In FIG. 8A, the star-shaped portion is a designated area, a bit of the mask information in this area is 1, and a bit of other mask information is 0. Since the entire mask information has the same configuration as that of the conversion coefficient by the two-dimensional discrete wavelet conversion, the bit in the mask information is checked so that it is possible to discriminate whether or not a coefficient of a corresponding position belongs to the designated area. The mask information generated in this manner is output to the quantization unit 3.

Further, the area designating unit 11 inputs a parameter for designating an image quality for the designating area from an input system (not shown). The parameter may be a value expressing the compressibility assigned to the designated area or a value expressing the image quality. The area designating unit 11 calculates the bit shift amount B with respect to the coefficient in the designated area from this parameter to output it to the quantization unit 3 together with the mask.

The quantization unit 3 quantizes the input coefficient by a predetermined quantization step, and outputs an index for the quantized value. Here, quantization is performed by the following equations:

$$q=\text{sign}(c)\text{floor}(abs(c)/\Delta) \quad \text{(Equation 3)}$$

$$\text{sign}(c)=1; c>=0 \quad \text{(Equation 4)}$$

$$\text{sign}(c)=-1; c<0 \quad \text{(Equation 5)}$$

where c is a coefficient to be quantized. Further, according to the present embodiment, a value of $\Delta$ includes 1. In this case, quantization is not performed.

Next, the quantization unit 3 changes the quantized index by the following equations on the basis of the mask input from the area designating unit 11 and the shift amount B:

$$q'=q*2^B; m=1 \quad \text{(Equation 6)}$$

$$q'=q; m=0 \quad \text{(Equation 7)}$$

where m is a value of the mask in the position of the quantized index. From the above process, only the quantized index which belongs to the spatial area designated by the area designating unit 11 is shifted up by B bits.

Figure 8B:
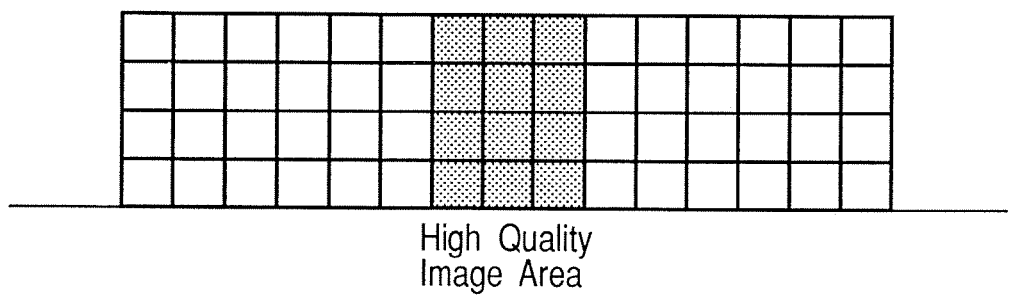
Figure 8C:
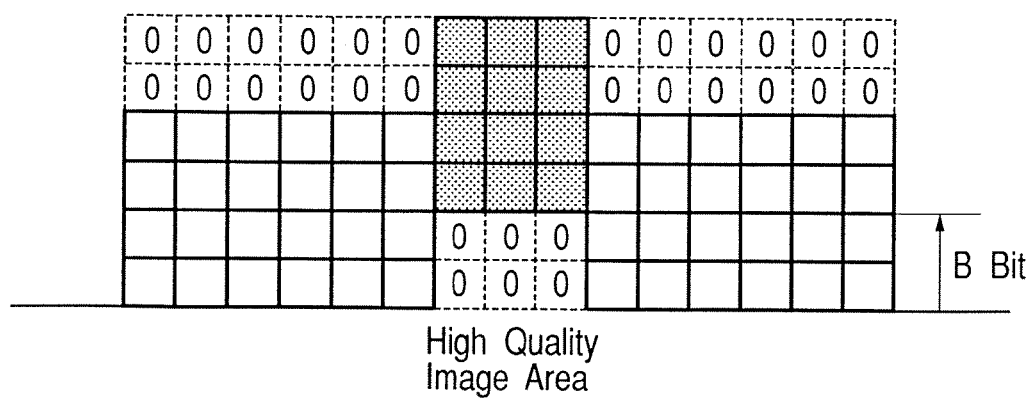

FIGS. 8B and 8C show a change in the quantized index resulting from this shift-up. FIG. 8B shows a quantized index group of a certain sub-band, where when a value of the mask in the meshed quantized index is 1 and the shift number B is 2, the quantized index after shift as shown in FIG. 8C is obtained. Each blank generated due to this bit shift is complemented by 0 as shown in the drawing.

The quantized index group after changed in this manner is output to the succeeding entropy encoding unit 4.

The mask information according to the present embodiment is used not only for the above shift-up process but also for accurately restoring the original image from the data obtained after encoding in the entropy encoding unit 4, but the present invention is not limited thereto. For example, when it is assumed that the shift-up number B is the same (4 bits in FIGS. 8A, 8B, and 8C) as the bit number of each quantized index to be subjected to bit shift process, the ROI and other area can be easily determined by the decoding side without transmitting the mask information to the decoding side so that the original image can be accurately restored.

The entropy encoding unit 4 decomposes the input quantized index into bit planes, and performs binary arithmetic encoding in bit plane unit to output a code stream. FIGS. 9A and 9B are diagrams for explaining operation of the entropy encoding unit 4. In this example, three non-zero quantized indices are present in the area in the sub-band having the size of 4×4, which have the values of +13, −6, and +3, respectively. The entropy encoding unit 4 scans this area to obtain the maximum value M, and calculates the bit number S required for realizing the maximum quantized index from the following equation:

$$S=\text{ceil}(\log 2(abs(M))) \quad \text{(Equation 8)}$$

where ceil(x) indicates the smallest integer value among the integers not less than x.

In FIGS. 9A and 9B, as the maximum coefficient value is 13, S comes to 4, and 16 quantized indices in a sequence are subjected to processing in 4-bit-plane unit as shown in FIG. 9B. At first, the entropy encoding unit 4 entropy-encodes (encodes in a binary arithmetic manner according to the present embodiment) each bit of the highest bit plane (shown by MSB in FIGS. 9A and 9B) to output it as a bit stream. Next, the bit plane is lowered by one level, and each bit in the bit plane is similarly encoded and output to the encoding output unit 5 until the target bit plane reaches the lowest bit plane (shown by LSB in FIGS. 9A and 9B). In the above entropy encode, it is assumed that a code of each quantized index continuously performs binary arithmetic encoding on 1 bit indicating positive/negative code of the quantized index immediately after a non-zero bit to be encoded in the bit plane scanning from the high-order to the low-order is detected. Thereby, the positive/negative code of the quantized index other than zero is efficiently encoded.

Figure 10A:
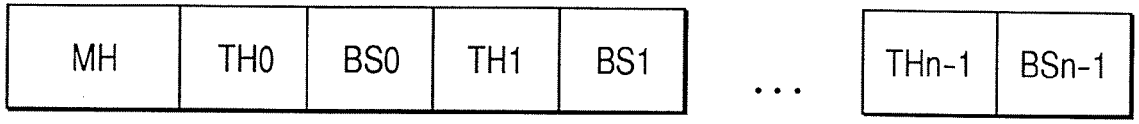
FIGS. 10A, 10B, 10C, and 10D are schematic diagrams showing a configuration of a code string generated and output according to the second embodiment.
Figure 10B:
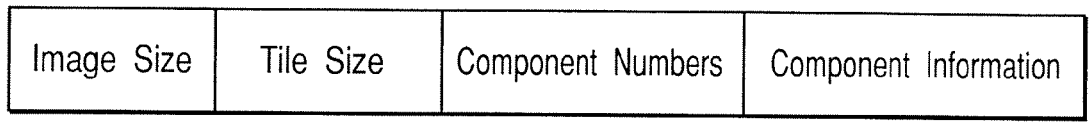

FIGS. 10A, 10B, 10C, and 10D are schematic diagrams showing a configuration of a code string generated and output in this manner. FIG. 10A shows the entire configuration of the code string, where MH is a main header, TH is a tile header, and BS is a bit stream. The main header MH is configured with an image size to be encoded (pixel numbers in the horizontal and vertical directions), a size when dividing the image into a plurality of tiles of rectangular areas, component numbers indicating each color component numbers, each component size, and component information indicating bit accuracy, as shown in FIG. 10B. According to the present embodiment, since the image is not divided into tiles, the tile size and the image size have the same value so that the component number is 1 when the target image is a monochrome multi-value image.

Figure 10C:
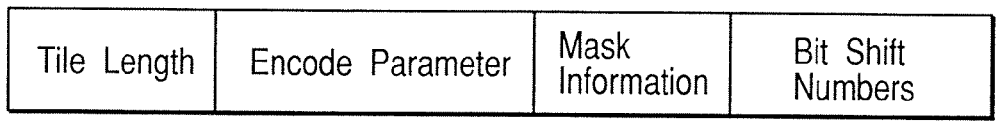
Figure 10D:
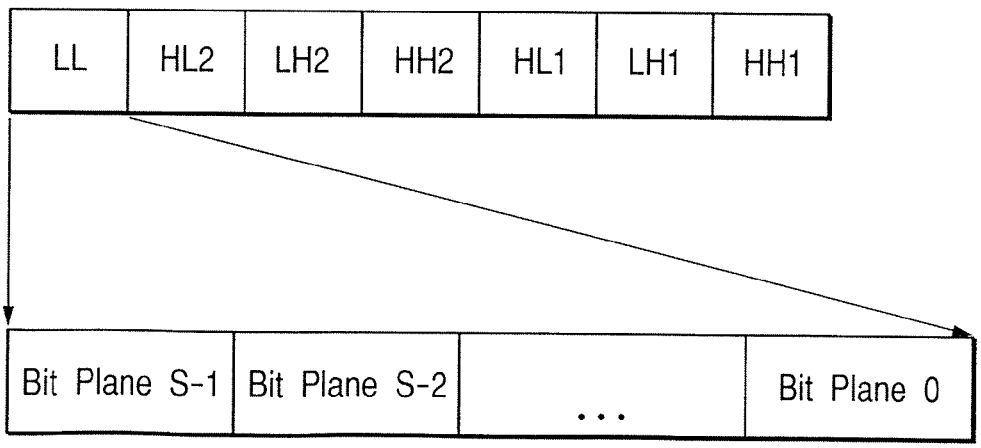

Next, a configuration of the tile header TH is shown in FIG. 10C. The tile header TH is configured with a tile length including a bit stream length and a header length of the tile, an encoding parameter for the tile, mask information indicating the designated area, and bit shift numbers for a coefficient belonging to the area. The encoding parameter includes a discrete wavelet conversion level, a filter type, and the like. A configuration of the bit stream according to the present embodiment is shown in FIG. 10D. In FIG. 10D, the bit streams are collected for each sub-band, and are sequentially arranged in ascending order of resolution with the sub-band having a low resolution as a header. Further, in each sub-band, codes are arranged in bit plane unit from the high-order bit plane toward the low-order bit plane.

Figure 11A:
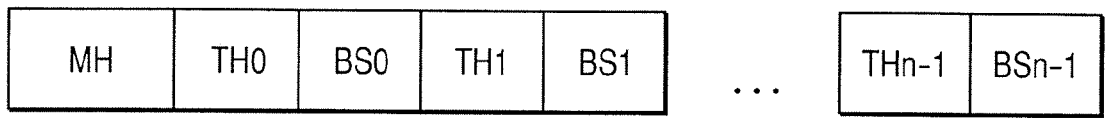
FIGS. 11A, 11B, 11C, and 11D are schematic diagrams showing a configuration of another code string generated and output according to the second embodiment.
Figure 11B:
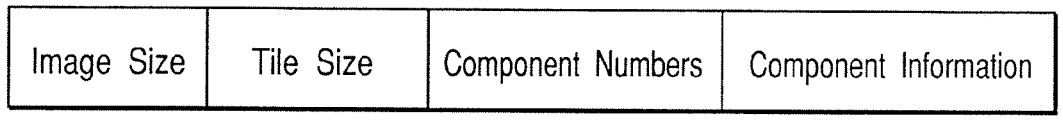

FIGS. 11A, 11B, 11C, and 11D are schematic diagrams showing a configuration of a code string generated and output in this manner. FIG. 11A shows the entire configuration of the code string, where MH is a main header, TH is a tile header, and BS is a bit stream. The main header MH is configured with an image size to be encoded (pixel numbers in the horizontal and vertical directions), a size of the image size divided into a plurality of tiles of rectangular areas, component numbers indicating each color component numbers, each component size, and component information indicating bit accuracy, as shown in FIG. 11B. According to the present embodiment, since the image is not divided into tiles, the tile size and the image size have the same value, so that the component number is 1 when the target image is a monochrome multi-value image.

Figure 11C:
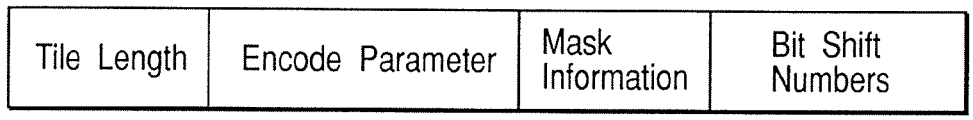
Figure 11D:
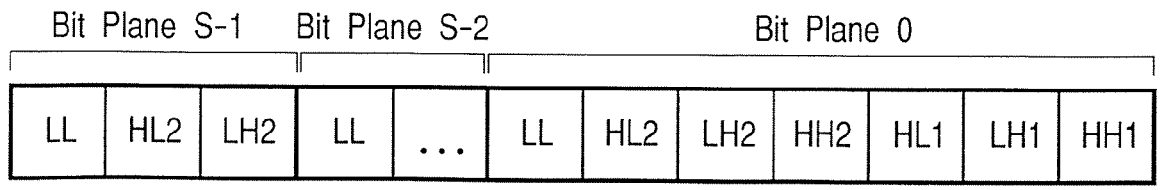

Next, a configuration of the tile header TH is shown in FIG. 11C. The tile header TH is configured with a tile length including a bit stream length and a header length of the tile, an encode parameter for the tile, mask information indicating the designated area, and bit shift numbers for a coefficient belonging to the area. The encode parameter includes a discrete wavelet conversion level, a filter type, and the like. A configuration of the bit stream according to the present embodiment is shown in FIG. 11D. In FIG. 11D, the bit streams are collected in units of bit planes, and are sequentially arranged from the high-order bit plane toward the low-order bit plane. In each bit plane, results obtained by encoding the bit planes of the quantized index in each sub-band are sequentially arranged in units of sub-bands. In the drawing, S is the bit number required for expressing the maximum quantized index. The code string generated in this manner is output to the encoding output unit 5.

According to the encode apparatus of the above embodiment, the compressibility of the entire image to be encoded can be controlled by changing the quantization step $\Delta$.

Further, according to another method of the present embodiment, the lower bits in the bit plane to be encoded in the entropy encoding unit 4 may be restricted (discarded) according to the required compressibility. In this case, not all the bit planes are encoded, and those bit planes required according to the desired compressibility are encoded from the high-order bit planes to be included in the final code string.

When a function of restricting the low-order bit planes is utilized, only the bits corresponding to the designated area shown in FIGS. 8A, 8B, and 8C are included in the code string. Namely, only the designated area can be encoded as a high quality image with the low compressibility.

A set of image data according to the present embodiment is a code string shown in FIGS. 10A, 10B, 10C, and 10D.

The code string shown in FIGS. 10A, 10B, 10C, and 10D can be regarded as being encoded in units of tiles, that is in units of sets of tile header THn and bit stream BSn, as shown in FIG. 10A. In other words, like a set of TH0 and BS, and a set of TH1 and BS1, sets of tile header and bit stream can be regarded as the hierarchized image data, respectively. When the set of TH0 and BS0 is regarded as the hierarchized image data img0 according to the first embodiment, the set of TH1 and BS1 is regarded as the hierarchized image data img1, and the set of THn and BSn is regarded as the hierarchized image data imgn, the encipher method described according to the first embodiment can be adapted, and adaptation examples are shown in FIGS. 12A and 12B. As shown in FIG. 12A, the set of the hierarchized image data TH0 and BS0 is encrypted by the key k0 and becomes the encrypted hierarchized image data encimg0. The set of the hierarchized image data Th1 and BS1 is encrypted by the key k1 converted from the key k0 and becomes the encrypted hierarchized image data encimg1. Similarly, the set of the hierarchized image data TH2 and BS2, and the set of TH3 and BS3 are also encrypted. Finally, the code string shown in FIG. 10A is encrypted as shown in FIG. 12B.

Further, a bit stream included in the code string shown in FIGS. 10A, 10B, 10C, and 10D can be regarded as being encoded in units of sub-bands as shown in FIG. 10D. That is, the sub-band encoded data such as LL, HL2, LH2, and the like can be regarded as the hierarchized image data, respectively, and adaptation examples according to the first embodiment are shown in FIGS. 13A and 13B. As shown in FIG. 13A, the hierarchized image data LL is enciphered by the key k0 and becomes the encrypted hierarchized image data encimg0. The hierarchized image data HL2 is encrypted by the key k1 converted from the key k0 and becomes the encrypted hierarchized image data encimg1. Similarly, the hierarchized image data LH2 and HH2 are also encrypted. Finally, the code string in units of sub-bands shown in FIG. 10D is encrypted as shown in FIG. 13B.

Further, the sub-band encoded data included in the code string shown in FIGS. 10A, 10B, 10C, and 10D can be regarded as being encoded in units of bit planes as shown in FIG. 10D. In other words, the data items of Bit Plane S-1 and Bit Plane S-2 in bit plane unit can be regarded as the hierarchized image data, respectively, so that the first embodiment can be adapted similarly to the encoding in units of tiles or encoding in units of sub-bands.

The first embodiment can be also adapted to the code string shown in FIGS. 11A, 11B, 11C, and 11D similarly to the code string shown in FIGS. 10A, 10B, 10C, and 10D. That is, first the case where each set of data, in units of tiles is regarded as the hierarchized data in correspondence to FIG. 11A, second, the case where each set of data in units of bit planes is regarded as the hierarchized image data in correspondence to FIG. 11D, and third, the case where each set of data in units of sub-bands is regarded as the hierarchized image data in correspondence to FIG. 11D are possible, respectively, so that the first embodiment can be adapted thereto, respectively.

When the code string shown in FIGS. 10A, 10B, 10C and 10D is a target, there is provided a method for generating hierarchized image data in units of tiles, in units of sub-bands, in units of bit planes, and by three parameters as described above. The present invention can encipher the hierarchized image data by a single parameter, and can encrypt the hierarchized image data in units of tiles, the hierarchized image data in units of sub-bands, and the hierarchized image data in units of bit planes at the same time.

In addition, the key used for encrypting the hierarchized image data by each parameter can utilize both the key chains independent for hierarchized image data by each parameter, and a single key chain.

Figure 14A:
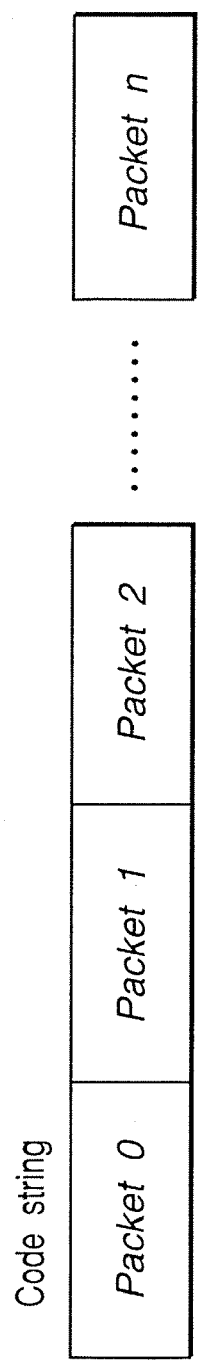
FIGS. 14A and 14B are diagrams showing a correspondence between a code string of image data which is a packet collection and encrypted keys according to the second embodiment.
Figure 14B:
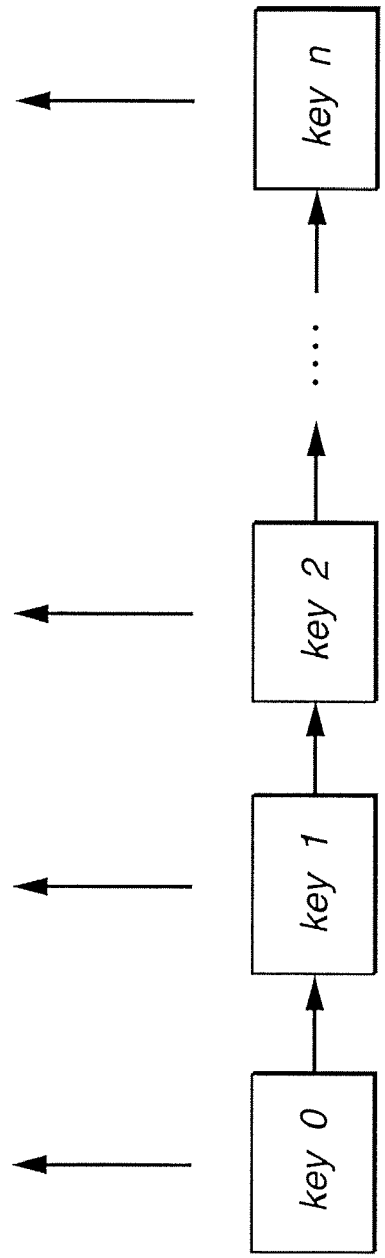

Correspondence between the code string of the image data which is a packet collection and encrypted keys in the above method is shown in FIGS. 14A and 14B. The packet to be encrypted indicates a typical data packet where the code string is collected in units of tiles, units of sub-bands, units of bit planes, or the like, and is not limited to specific units. In the above method, the order of packets in the code string and the order of the key chain are directed in the same direction as shown in FIGS. 14A and 14B. The user holding a key can use only that key and a key converted from that key. Namely, in FIGS. 14A and 14B, the user A holding a key1 can use a key2, a key3, ..., a keyn, but cannot obtain a key0. In other words, the user A can use a Packet1, a Packet2, ..., a Packetn, but cannot use a Packet0, so that there arises a possibility that the JPEG2000 code string cannot be accurately decoded.

On the contrary, correspondence between a code string of the image data and encrypted keys is taken as shown in FIGS. 15A and 15B so that the above problem can be solved. In other words, there is provided a method where the packet which appears at the beginning of the code string is treated as the lower hierarchized data. This method is otherwise the same as the above method so that further description thereof will be omitted.

As described above, according to the second embodiment, it is possible to provide a method capable of easily performing key management when access control is realized using a key with respect to hierarchized image data adaptation by the JPEG2000 image encode method.

OTHER EMBODIMENTS

A computer executes a program so that the present invention can be realized. Further, means for supplying a program to a computer, for example a computer readable recording medium such as CD-ROM recording the program therein, or a transmitting medium such as the Internet for transmitting the program can be adapted as an embodiment of the present invention. Furthermore, a program product such as the computer readable recording medium recording the above program therein can be also adapted as an embodiment of the present invention. The above program, recording medium, transmitting medium, and program product are included in the scope of the present invention. As the recording medium, there can be employed, for example, a flexible disk, a hard disk, an optical disk, a magnetooptical disk, a CD-ROM, a magnetic tape, a non-volatile memory card, a ROM, and the like.

The above embodiments are only specific examples for implementing the present invention, and it is not intended that the technical scope of the present invention is interpreted in a limited manner. In other words, the present invention can be variously implemented without departing from the technical spirit or the primary feature.

As explained above, since when encryption is performed using a key for each hierarchy with respect to data in each level of the hierarchy, a key different for each level on the basis of a specific key is generated, key management can be easily performed. Further, an encrypted key is supplied to a user together with encrypted data so that key distribution to the user can be easily performed.

As described above, the data process apparatus and method therefor according to the present invention is useful for encrypting data having a hierarchical structure, particularly for encrypting hierarchized image data such as Flash Pix or JPEG2000.

What is claimed is:

1. A data processing method comprising:
an encoding step of encoding image data into a plurality of bit streams arranged in ascending order of resolution levels;
a first key generation step of generating a plurality of keys for respective resolution levels of the encoded image data, the first key generation step generating a key for the highest resolution level by converting a basic key with a predetermined function and generating respective keys for other resolution levels by repetitively converting a key for a preceding resolution level with the predetermined function;
an encryption step of encrypting each of the bit streams using a corresponding one of the plurality of keys;
a delivery step of delivering all of the encrypted bit streams in ascending order of resolution levels to a user with a key for a predetermined resolution level corresponding to the user;
a second key generation step of generating respective keys for resolution levels under the predetermined resolution level by repetitively converting the key for the predetermined resolution level with the predetermined function; and
a decryption step of sequentially applying the keys generated in the second key generation step in order of generation to the delivered bit streams in order of delivery, thereby decrypting the encrypted bit stream in the predetermined resolution level using the key for the predetermined resolution level and decrypting the encrypted bit stream in each of resolution levels under the predetermined resolution level using the respective keys.

2. A data processing method according to claim 1, wherein the predetermined function is a one-way function.

3. A data processing method according to claim 1, wherein an encryption method of the encrypted key is a private key encryption algorithm.

4. A data processing method according to claim 1, wherein an encryption method of the encrypted key is a public key encryption algorithm.

5. A data processing method according to claim 1, wherein the data having a hierarchical structure is image data.

6. A data processing method according to claim 1, wherein the data having a hierarchical structure is multimedia data.

7. A data processing method according to claim 1, wherein a key used for encrypting or decoding image data in a highest level of the hierarchy is specific private information or information dependent on the data.

8. A data processing method according to claim 1, wherein the hierarchical structure is a hierarchical structure based on resolution, and the resolution becomes higher as a level of the hierarchy is higher.

9. A data processing method according to claim 1, wherein the hierarchical structure is a hierarchical structure based on resolution, and a degree of importance becomes higher as a level of the hierarchy is higher.

10. A data processing method according to claim 1, wherein the hierarchical structure is a hierarchical structure based on SNR, and the SNR becomes lower as a level of the hierarchy is higher.

* * * * *